(12) United States Patent
Yan

(10) Patent No.: US 7,352,153 B2
(45) Date of Patent: Apr. 1, 2008

(54) MOBILE ROBOTIC SYSTEM AND BATTERY CHARGING METHOD THEREFOR

(76) Inventor: Jason Yan, No. 8, Lane 108, Ya-Chou Road, Tu-Cheng City, Taipei Hsien (TW)

( * ) Notice: Subject to any disclaimer, the term of this patent is extended or adjusted under 35 U.S.C. 154(b) by 356 days.

(21) Appl. No.: 10/877,865

(22) Filed: Jun. 25, 2004

(65) Prior Publication Data
US 2005/0231156 A1 Oct. 20, 2005

(51) Int. Cl.
*H02J 7/00* (2006.01)
*B25J 9/18* (2006.01)

(52) U.S. Cl. .................. 320/107; 318/568.11; 483/901; 901/1

(58) Field of Classification Search ................. 320/107; 318/568.11; 483/901; 901/1
See application file for complete search history.

(56) References Cited
U.S. PATENT DOCUMENTS 4,679,152 A * 7/1987 Perdue ........................ 701/23
5,440,216 A * 8/1995 Kim ............................ 318/587
5,646,494 A * 7/1997 Han ............................ 318/587
5,682,640 A 11/1997 Han ............................. 15/319
6,389,329 B1 * 5/2002 Colens ........................ 700/262

* cited by examiner

*Primary Examiner*—Gary L Laxton
*Assistant Examiner*—Yalkew Fantu
(74) *Attorney, Agent, or Firm*—Bacon & Thomas, PLLC

(57) ABSTRACT

A mobile robotic system includes a charging device and a mobile robot. The charging device is provided with a light emitter and a set of first charging contacts for supplying a charging signal. The mobile robot has a first side provided with a first light sensor, a second side provided with a second light sensor and a set of second charging contacts corresponding to the first charging contacts, a rechargeable battery unit, and a control unit. When charging of the battery unit is intended, the control unit enables movement of the mobile robot until the first light sensor detects light emitted by the light emitter, subsequently enables rotation of the mobile robot until the second light sensor detects the light from the light emitter, and then enables movement of the mobile robot toward the charging device until the first and second charging contacts come into contact.

15 Claims, 5 Drawing Sheets

MOBILE ROBOTIC SYSTEM AND BATTERY CHARGING METHOD THEREFOR

BACKGROUND OF THE INVENTION

1. Field of the Invention

The invention relates to a mobile robotic system, more particularly to a battery charging method for a mobile robotic system.

2. Description of the Related Art

Robotic vacuum floor cleaners have grown in popularity in recent years due to the rapid reduction in their manufacturing costs. Conventional robotic vacuum floor cleaners generally utilize rechargeable batteries as a source of power. When battery power runs low, the cleaner will not be able to operate. Hence, inconvenience is encountered since there is a need for the user to check periodically the power level of the rechargeable batteries so that charging of the latter may be conducted under manual supervision whenever the battery power runs low. In view of the foregoing, various automatic battery charging systems, such as those disclosed in U.S. Pat. Nos. 4,679,152, 5,682,640 and 5,646,494, for robotic vacuum floor cleaners have been proposed heretofore so that the cleaners are able to move to a charging station for battery charging without human intervention whenever the battery power runs low. Nevertheless, the known automatic battery charging systems for robotic vacuum floor cleaners are disadvantageous in that they involve complex designs that are costly to implement and that require precise alignment between the cleaner and the charging station before battery charging can commence.

SUMMARY OF THE INVENTION

Therefore, the object of the present invention is to provide a battery charging method for a mobile robotic system that can overcome the aforesaid drawbacks associated with the prior art.

Another object of the present invention is to provide a mobile robotic system that includes a mobile robot and a charging device for implementing the method of this invention.

According to one aspect of the present invention, there is provided a battery charging method for a mobile robotic system that includes a mobile robot and a charging device. The charging device has one side provided with a light emitter and a set of first charging contacts for supplying a charging signal. The mobile robot has a first side provided with a first light sensor, a second side provided with a second light sensor and a set of second charging contacts corresponding to the first charging contacts, and a rechargeable battery unit. The battery charging method comprises:

a) when charging of the rechargeable battery unit is intended, moving the mobile robot until the first light sensor detects light emitted by the light emitter, and subsequently driving the mobile robot to rotate until the second light sensor detects the light emitted by the light emitter; and b) while the second light sensor detects the light emitted by the light emitter, driving the mobile robot to move toward the charging device until the second charging contacts come into contact with the first charging contacts, thereby permitting charging of the rechargeable battery unit via the charging signal.

According to another aspect of the present invention, there is provided mobile robotic system that comprises a charging device and a mobile robot. The charging device has one side provided with a light emitter and a set of first charging contacts for supplying a charging signal. The mobile robot has a first side provided with a first light sensor, a second side provided with a second light sensor and a set of second charging contacts corresponding to the first charging contacts, a rechargeable battery unit, and a control unit coupled to the first and second light sensors, the second charging contacts and the rechargeable battery unit.

When charging of the rechargeable battery unit is intended, the control unit enables movement of the mobile robot until the first light sensor detects light emitted by the light emitter, subsequently enables rotation of the mobile robot until the second light sensor detects the light emitted by the light emitter, and, while the second light sensor detects the light emitted by the light emitter, enables movement of the mobile robot toward the charging device until the second charging contacts come into contact with the first charging contacts, thereby permitting charging of the rechargeable battery unit via the charging signal.

According to yet another aspect of the present invention, there is provided a mobile robot adapted for use with a charging device. The charging device has one side provided with a light emitter and a set of first charging contacts for supplying a charging signal. The mobile robot comprises a housing, a rechargeable battery unit, and a control unit. The housing has a first side provided with a first light sensor, and a second side provided with a second light sensor and a set of second charging contacts corresponding to the first charging contacts. The rechargeable battery unit is disposed in the housing. The control unit is coupled to the first and second light sensors, the second charging contacts, and the rechargeable battery unit.

When charging of the rechargeable battery unit is intended, the control unit enables movement of the mobile robot until the first light sensor is able to detect light emitted by the light emitter, subsequently enables rotation of the mobile robot until the second light sensor is able to detect the light emitted by the light emitter, and, while the second light sensor detects the light emitted by the light emitter, enables movement of the mobile robot toward the charging device until the second charging contacts are able to come into contact with the first charging contacts, thereby permitting charging of the rechargeable battery unit via the charging signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
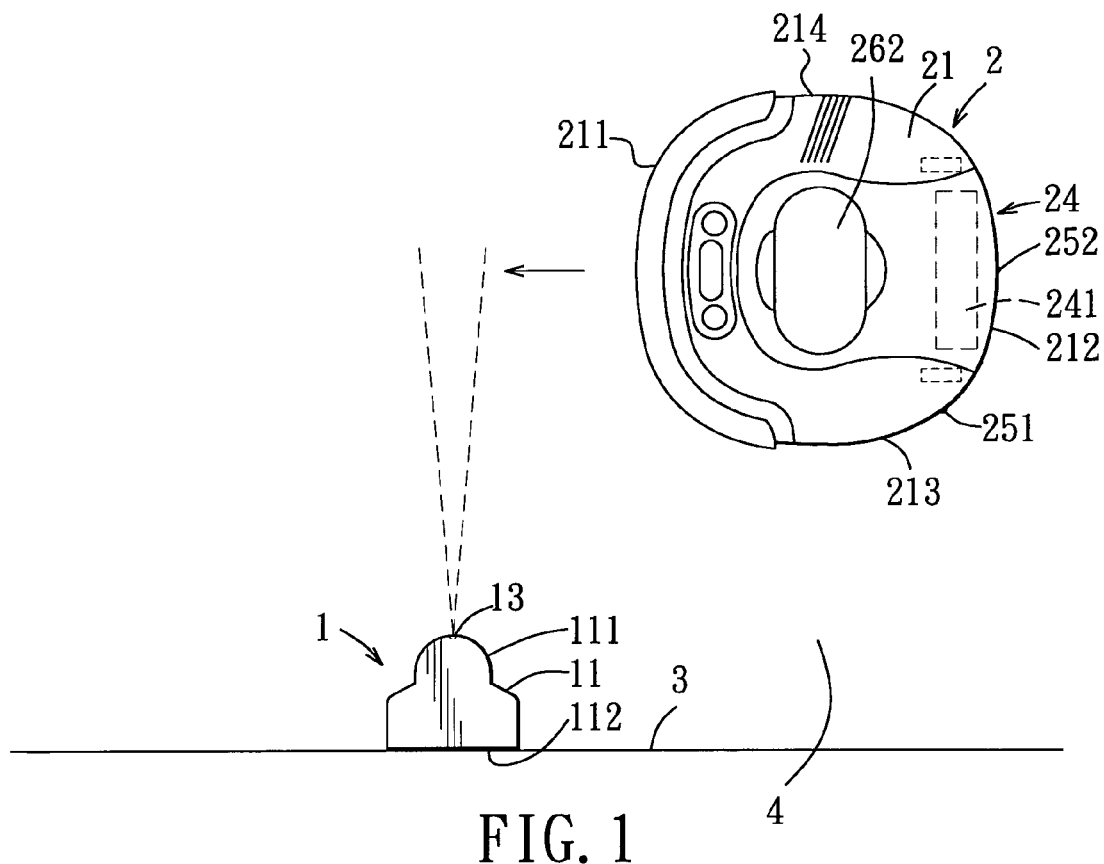
FIG. 1 is a schematic top view of the preferred embodiment of a mobile robotic system according to the present invention.

Referring to FIG. 1, the preferred embodiment of a mobile robotic system according to the present invention is shown to include a charging device 1 and a mobile robot 2. In this embodiment, the mobile robot 2 is exemplified as a robotic vacuum floor cleaner but should not be limited thereto. Moreover, in practice, the mobile robot 2 may be associated with a set of the charging devices 1 that are disposed at different locations so that the mobile robot 2 is able to locate one of the charging devices 1 within a relatively short amount of time so that battery charging can be conducted immediately when battery power runs low.

Figure 5:
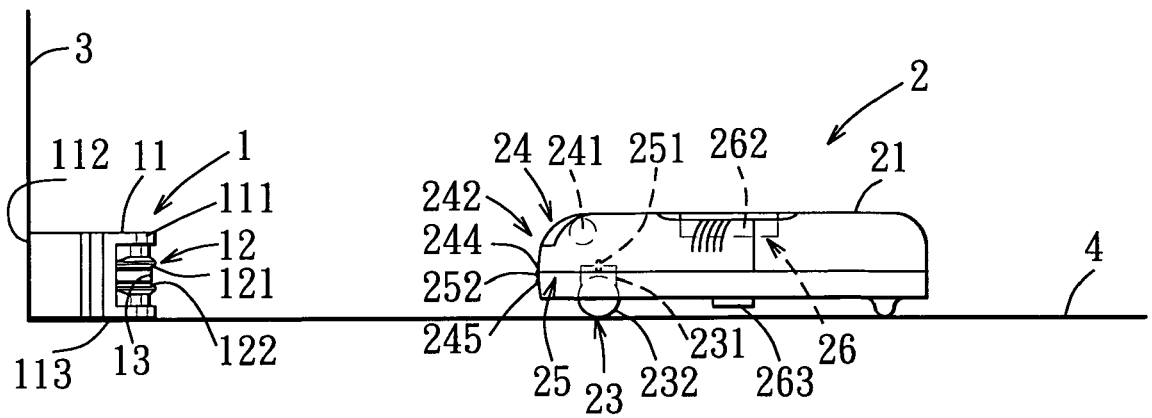
FIG. 5 is a schematic side view of FIG. 4.

Referring to FIGS. 1 and 5, the charging device 1 includes a casing 11, a power cord (not shown) extending from the casing 11 and a transformer (not shown) disposed in the casing 11 and connected to the power cord. The power cord is to be coupled to an electrical socket (not shown) on a wall 3 so that a commercial alternating current (ac) power signal is relayed to the transformer. The casing 11 has a convex front side 111 provided with a light emitter 13 and a set of first charging contacts 12 connected to the transformer. The transformer transforms the ac power signal into a charging signal that is supplied to the mobile robot 2 through the first charging contacts 12. The casing 11 further has a flat rear side 112 disposed to abut against the wall 3, and a bottom side 113 to be disposed on a floor 4.

In this embodiment, the first charging contacts 12 are curved contacts that are disposed horizontally on the front side 111 of the casing 11, and include positive and negative contacts 121, 122 that are spaced apart vertically. The light emitter 13 is disposed between the positive and negative contacts 121, 122, draws power from the power cord, and emits a cone-shaped light beam. In this embodiment, the light emitter 13 is an infrared light emitting diode (LED) but should not be limited thereto.

Figure 2:
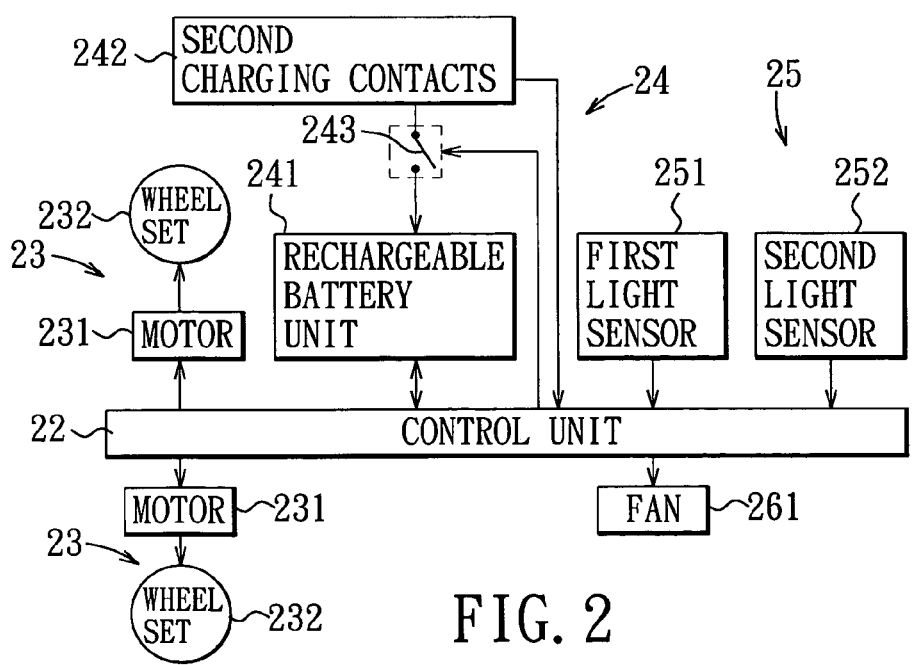
FIG. 2 is a schematic block diagram of a mobile robot of the preferred embodiment.

As shown in FIGS. 1, 2 and 5, the mobile robot 2 comprises a housing 21, a control unit 22, a driving unit 23, a power supplying unit 24, a light sensing unit 25, and a vacuuming unit 26.

The housing 21 has a front side 211, a rear side 212, a right lateral side 213, and a left lateral side 214. The control unit 22 is disposed in the housing 21, and is responsible for controlling operation of the various components of the mobile robot 2. The driving unit 23 includes wheel sets 232 mounted on left and right sides of the housing 21, and motors 231 coupled to and controlled by the control unit 22 for driving rotation of the wheel sets 232 so as to enable forward and backward movement, as well as clockwise and counterclockwise rotation, of the mobile robot 2 on the floor 4 in a known manner.

The power supplying unit 24 includes a rechargeable battery unit 241 that is disposed in the housing 21, a set of second charging contacts 242 corresponding to the first charging contacts 12, and a switch 243 for making and breaking electrical connection between the rechargeable battery unit 241 and the second charging contacts 242. The second charging contacts 242 are provided on the rear side 212 of the housing 21, and include positive and negative contacts 244, 245 that correspond to the positive and negative contacts 121, 122 and that are spaced apart vertically.

The light sensing unit 25 includes first and second light sensors 251, 252 coupled to the control unit 22 and capable of sensing the light beam from the light emitter 13 of the charging device 1. In this embodiment, the first light sensor 251 is provided on the right lateral side 213 of the housing 21 proximate to the rear side 212, and faces in a first direction. The second light sensor 252 is provided on the rear side 212 of the housing 21, is disposed between the positive and negative contacts 244, 245, and faces in a second direction generally transverse to the first direction. In practice, the first light sensor 251 maybe provided instead on the left lateral side 214 of the housing 21. Alternatively, each of the right and left lateral sides 213, 214 of the housing 21 may be provided with a respective first light sensor 251.

The vacuum unit 26 is disposed in the housing 21, and includes a fan 261 that is controlled by the control unit 22 so as to generate an intake current for sucking in dust and other particles, a dust collecting container 262 for collecting dust, and a conduit 263 connecting the fan 261 and the dust collecting container 262. Since the feature of this invention does not reside in the particular construction of the vacuum unit 26, which is conventional in construction, the vacuum unit 26 will not be described further herein for the sake of brevity.

Figure 9:
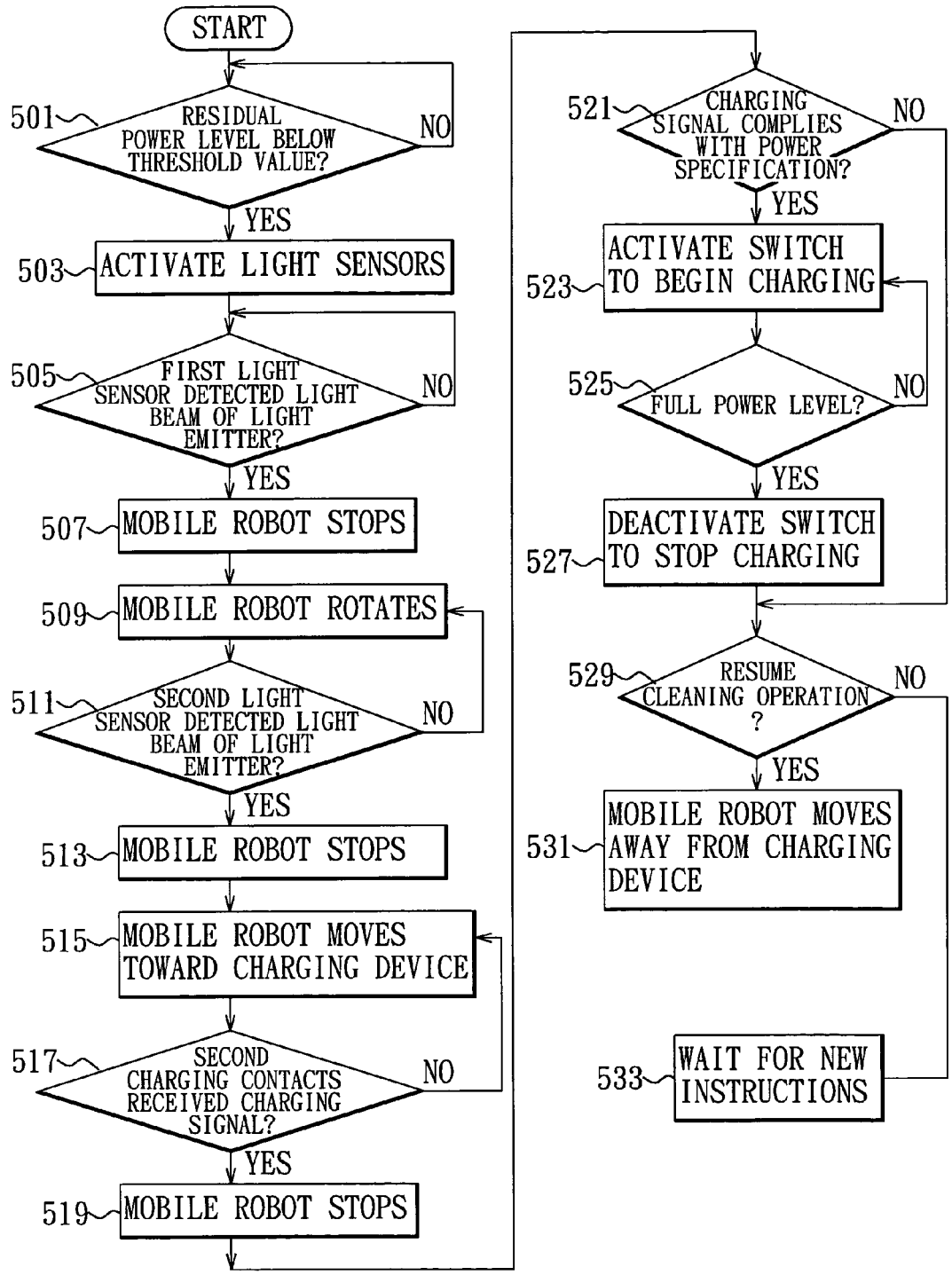
FIG. 9 is a flowchart to illustrate the preferred embodiment of a battery charging method according to this invention.

FIG. 9 illustrates the battery charging method performed by the mobile robotic system of this embodiment.

Referring to FIGS. 1 and 9, in step 501, while the mobile robot 2 performs a routine cleaning operation, the control unit 22 continuously monitors whether a residual power level of the rechargeable battery unit 241 is below a threshold value. In the affirmative, the flow goes to step 503.

In step 503, the control unit 22 activates the first and second light sensors 251, 253, and the flow goes to step 505.

Figure 3:
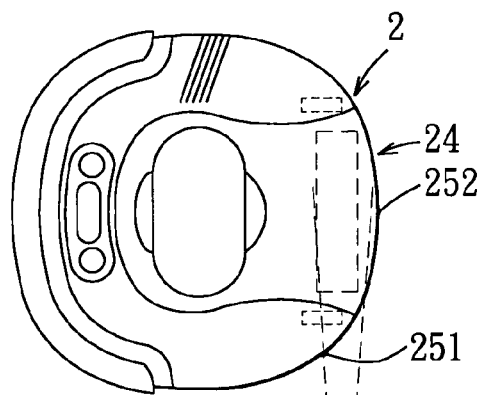
FIG. 3 is a schematic top view to illustrate a state in which a first light sensor of the mobile robot detects light emitted by a light emitter of a charging device of the mobile robotic system.
Figure 3:
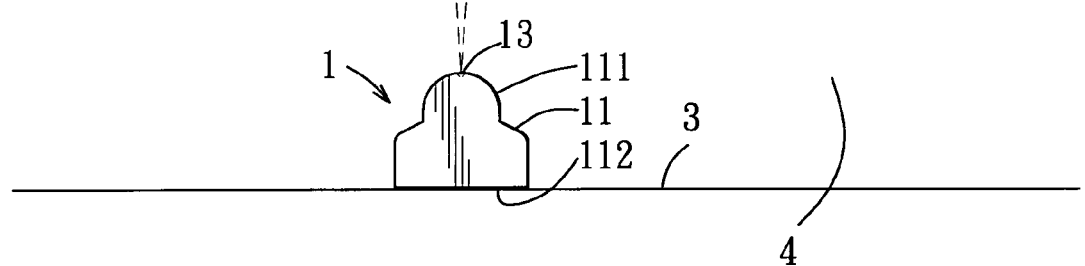

In step 505, the control unit 22 enables movement of the mobile robot 2 until the first light sensor 251 detects the light beam emitted by the light emitter 13, as shown in FIG. 3.

Once the first light sensor 251 detects the light beam from the light emitter 13, the flow goes to step 507, where the control unit 22 stops movement of the mobile robot 2.

Thereafter, in step 509, the control unit 22 controls the driving unit 23 to enable rotation of the mobile robot 2. Subsequently, in step 511, the control unit 22 determines whether the second light sensor 252 has detected the light beam emitted by the light emitter 13. In the affirmative, the flow goes to step 513.

Figure 4:
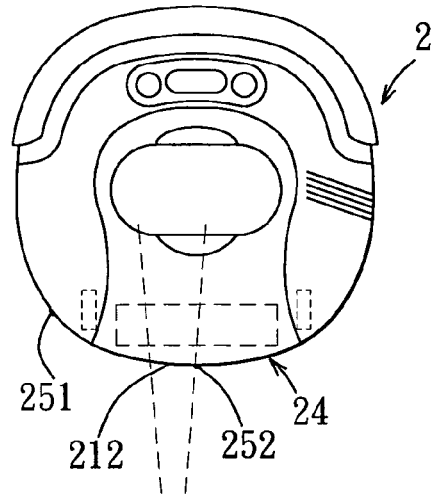
FIG. 4 is a schematic top view to illustrate a state in which a second light sensor of the mobile robot detects the light emitted by the light emitter of the charging device.
Figure 4:
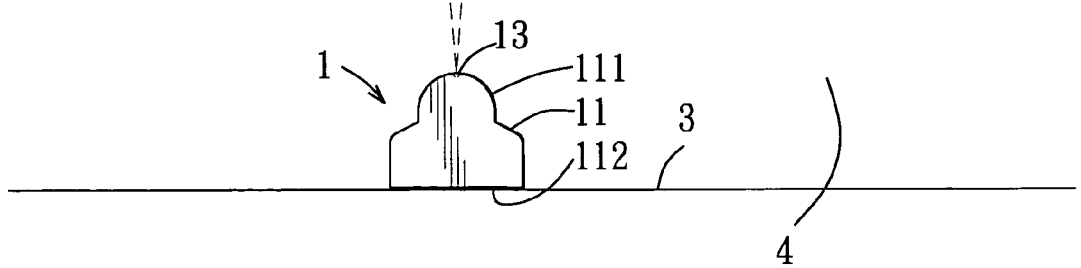

In step 513, the control unit 22 stops further rotation of the mobile robot 2. The rear side 212 of the housing 21 confronts the charging device 1 at this time, as best shown in FIGS. 4 and 5.

Figure 6:
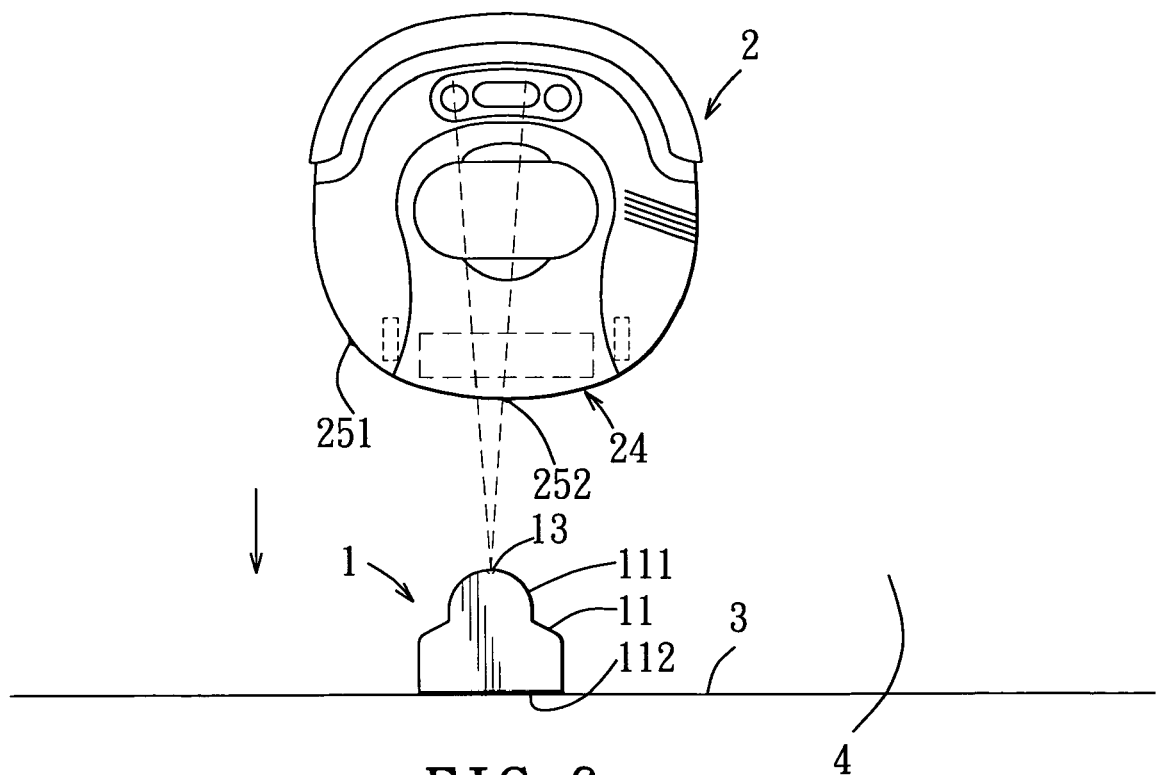
FIG. 6 is a schematic top view to illustrate a state in which the mobile robot moves toward the charging device.
Figure 7:
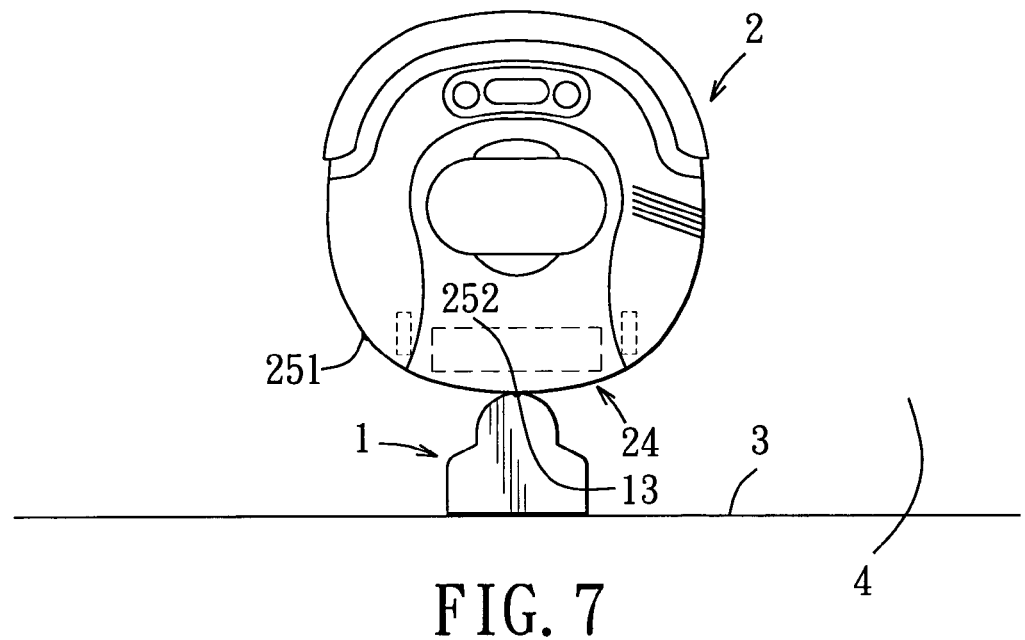
FIG. 7 is a schematic top view to illustrate the mobile robot in a charging position.
Figure 8:
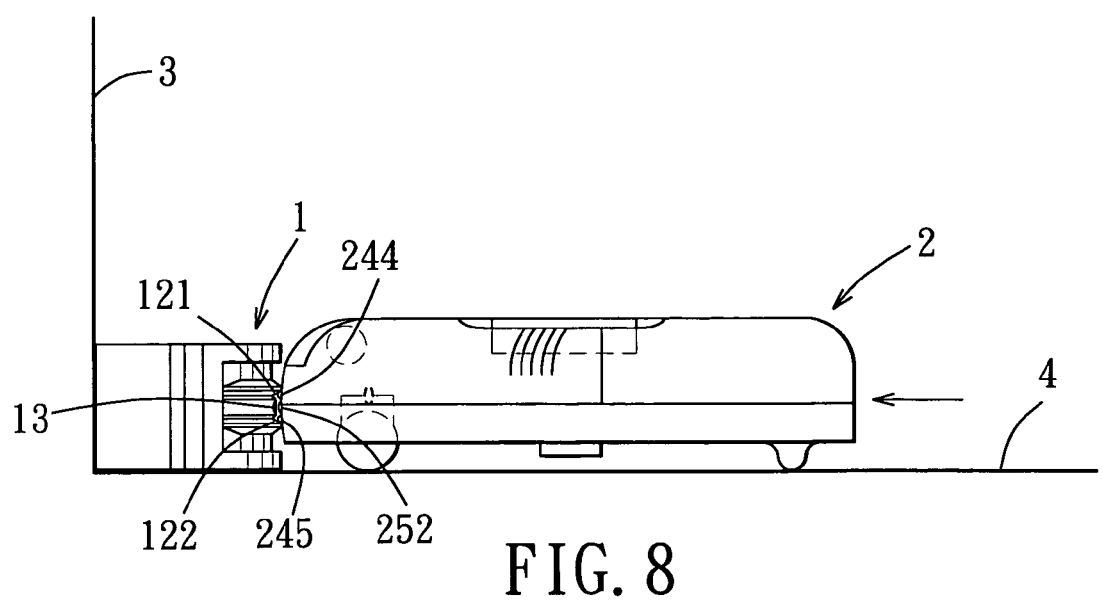
FIG. 8 is a schematic side view of FIG. 7.

Afterwards, in step 515, the control unit 22 controls the driving unit 23 to enable movement of the mobile robot 2 toward the charging device 1, as best shown in FIG. 6. Thereafter, in step 517, the control unit 22 determines whether the mobile robot 2 has reached a charging position, i.e., whether the second charging contacts 242 have established contact with the first charging contacts 12 so as to receive the charging signal therefrom, as best shown in FIGS. 7 and 8. In the affirmative, the flow goes to step 519, where the control unit 22 stops further movement of the mobile robot 2. The flow then goes to step 521.

In step 521, the control unit 22 determines whether the charging signal from the charging device 1 complies with a predetermined power specification of the rechargeable battery unit 241. In the affirmative, the flow goes to step 523. Otherwise, the flow goes to step 529.

In step 523, the control unit 22 activates the switch 243 to make electrical connection between the second charging contacts 242 and the rechargeable battery unit 241. Charging of the rechargeable battery unit 241 proceeds at this time.

Then, in step 525, while the rechargeable battery unit 241 is being charged, the control unit 22 monitors whether the power level of the rechargeable battery unit 241 has reached full power. In the affirmative, the flow goes to step 527.

In step 527, the control unit 22 deactivates the switch 243 to terminate charging of the rechargeable battery unit 241. The flow then goes to step 529.

In step 529, it is determined whether a cleaning operation is to be resumed. In the affirmative, the flow goes to step 531, where the control unit 22 controls the driving unit 23 to enable movement of the mobile robot 2 away from the charging device 1, thereby permitting resumption of the routine cleaning operation. Otherwise, the mobile robot 2 waits for new instructions in step 533.

In this embodiment, when the charging signal does not comply with the power specification of the rechargeable battery unit 241, charging of the rechargeable battery unit 241 does not occur, and the control unit 22 controls the driving unit 23 so as to enable movement of the mobile robot 2 away from the charging device 1, thereby protecting the mobile robot 2 from damage.

Moreover, due to the configuration of the first charging contacts 12, which are curved contacts that are disposed horizontally, electrical connection between the first and second charging contacts 12, 242 can be ensured when the mobile robot 2 is at the charging position.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

I claim:

1. A battery charging method for a mobile robotic system that includes a mobile robot and a charging device,
the charging device having one side provided with a light emitter and a set of first charging contacts for supplying a charging signal,
the mobile robot having a first side provided with a first light sensor facing in a first direction, a second side provided with a second light sensor facing in a second direction generally transverse to said first direction, a set of second charging contacts disposed on said second side and corresponding to the first charging contacts, and a rechargeable battery unit,
said battery charging method comprising the steps of:
a) when charging of the rechargeable battery unit is intended, moving the mobile robot until the first light sensor detects light emitted by the light emitter, stopping the mobile robot, and subsequently rotating the mobile robot until the second light sensor detects the light emitted by the light emitter; and
b) while the second light sensor detects the light emitted by the light emitter, driving the mobile robot to move toward the charging device until the second charging contacts come into contact with the first charging contacts, thereby permitting charging of the rechargeable battery unit via the charging signal.

2. The battery charging method as claimed in claim 1, wherein step a) includes activating the first and second light sensors upon detection that a residual power level of the rechargeable battery unit is below a threshold value.

3. The battery charging method as claimed in claim 1, wherein step b) includes enabling the mobile robot to charge the rechargeable battery unit via the charging signal only upon verifying that the charging signal complies with a power specification of the rechargeable battery unit.

4. A mobile robotic system comprising:
a charging device having one side provided with an infrared light emitter and a set of first charging contacts for supplying a charging signal; and
a mobile robot having a first side provided with a first light sensor facing in a first direction, a second side provided with a second light sensor facing in a second direction generally transverse to said first direction, and a set of second charging contacts disposed on said second side and corresponding to said first charging contacts, a rechargeable battery unit, and a control unit coupled to said first and second light sensors, said second charging contacts and said rechargeable battery unit;
wherein, when charging of said rechargeable battery unit is intended, said control unit enables movement of said mobile robot until said first light sensor detects light emitted by said light emitter and then stops movement of said mobile robot, enables rotation of said mobile robot until said second light sensor detects the light emitted by said light emitter, and while said second light emitting sensor detects the light emitted by said light emitter, enables movement of said mobile robot toward said charging device until said second charging contacts come into contact with said first charging contacts, thereby permitting charging of said rechargeable battery unit via the charging signal.

5. The mobile robotic system as claimed in 4, wherein said control unit activates said first and second light sensors upon detection that a residual power level of said rechargeable battery unit is below a threshold value.

6. The mobile robotic system as claimed in claim 4, wherein said control unit enables charging of said rechargeable battery unit via the charging signal only upon verifying that the charging signal complies with a power specification of said rechargeable battery unit.

7. The mobile robotic system as claimed in claim 4, wherein said mobile robot is a robotic vacuum floor cleaner.

8. The mobile robotic system as claimed in claim 4, wherein said first charging contacts extend horizontally.

9. The mobile robotic system as claimed in claim 8, wherein said light emitter is disposed between said first charging contacts.

10. The mobile robotic system as claimed in claim 8, wherein said first charging contacts are curved contacts that are disposed horizontally.

11. The mobile robotic system as claimed in claim 4, wherein said first side of said mobile robot is a lateral side.

12. The mobile robotic system as claimed in claim 11, wherein said second side of said mobile robot is a rear side.

13. The mobile robotic system as claimed in claim 12, wherein said first light sensor is disposed on said first side proximate to said second side.

14. The mobile robotic system as claimed in claim 4, wherein said second light sensor is disposed between said second charging contacts.

15. The mobile robotic system as claimed in claim 14, wherein said second charging contacts are spaced apart vertically.

* * * * *